United States Patent

Tabary

[15] 3,683,628
[45] Aug. 15, 1972

[54] STORAGE OF FLUIDS

[72] Inventor: Jean Tabary, Paris, France

[73] Assignee: Lebon & Cie (Cie Centrale d Eclairage Par l Gas), Paris, France

[22] Filed: May 4, 1970

[21] Appl. No.: 34,028

[30] Foreign Application Priority Data

May 5, 1969 France......................6914203

[52] U.S. Cl. .........................61/.5, 73/290, 73/317, 156/64

[51] Int. Cl..........................B65g 5/00, E21f 17/16

[58] Field of Search.............61/.5; 156/293, 423, 64; 73/290, 40.7, 317; 48/174

[56] References Cited

UNITED STATES PATENTS

| | | | |
|---|---|---|---|
| 3,184,922 | 5/1965 | Anton | 61/.5 |
| 896,706 | 8/1908 | Brent | 73/317 |
| 27,498 | 3/1860 | Hoyt | 73/317 |
| 3,068,561 | 12/1962 | Jones | 61/.5 |
| 3,460,125 | 8/1969 | Lieberman | 73/40.7 |
| 3,483,735 | 12/1969 | Packo | 73/40.7 |
| 3,523,771 | 8/1970 | Anderson | 73/40.7 |

FOREIGN PATENTS OR APPLICATIONS

| | | | |
|---|---|---|---|
| 471,016 | 5/1969 | Switzerland | 61/.5 |
| 1,292,081 | 4/1969 | Germany | 61/.5 |
| 225,621 | 1963 | Austria | 61/.5 |
| 355,357 | 1931 | Great Britain | 61/.5 |
| 463,392 | 11/1968 | Switzerland | 61/.5 |

OTHER PUBLICATIONS

Budocks Technical Digest No. 61 (US Navy) pages 7–12

*Primary Examiner*—Jacob Shapiro
*Attorney*—Hopgood and Calimafde

[57] ABSTRACT

A reservoir for storing fluids, in particular petroleum products, in underground cavities, and a method for the construction of the reservoir ; the walls of the cavity are covered with mortar forming a rigid lining having a relatively smooth surface, sheets of flexible impermeable plastic material are secured to the lining by an adhesive and sealing joined to one another by a sealing compound to form a fluidtight skin. An interstitial layer is formed between the skin and the lining which is adapted to collect leaks from the reservoir or to collect subterranean water from the surrounding ; a gutter in the interstitial layer and a pipe in communication therewith are provided for removing and detecting leaks of the stored product or removing subterranean water from the interstitial layer. Other methods for testing the fluidtightness of the skin include : by sound, applying a vacuum to the interstitial layer and connecting the interior of the reservoir with the atmosphere ; visually forming the skin of transparent material wherein the adhesive is marked by the fluiding leaking from the reservoir ; and electrostatically, with a scanning device checking the dielectric continuity of the skin.

20 Claims, 9 Drawing Figures

Patented Aug. 15, 1972  3,683,628

Patented Aug. 15, 1972

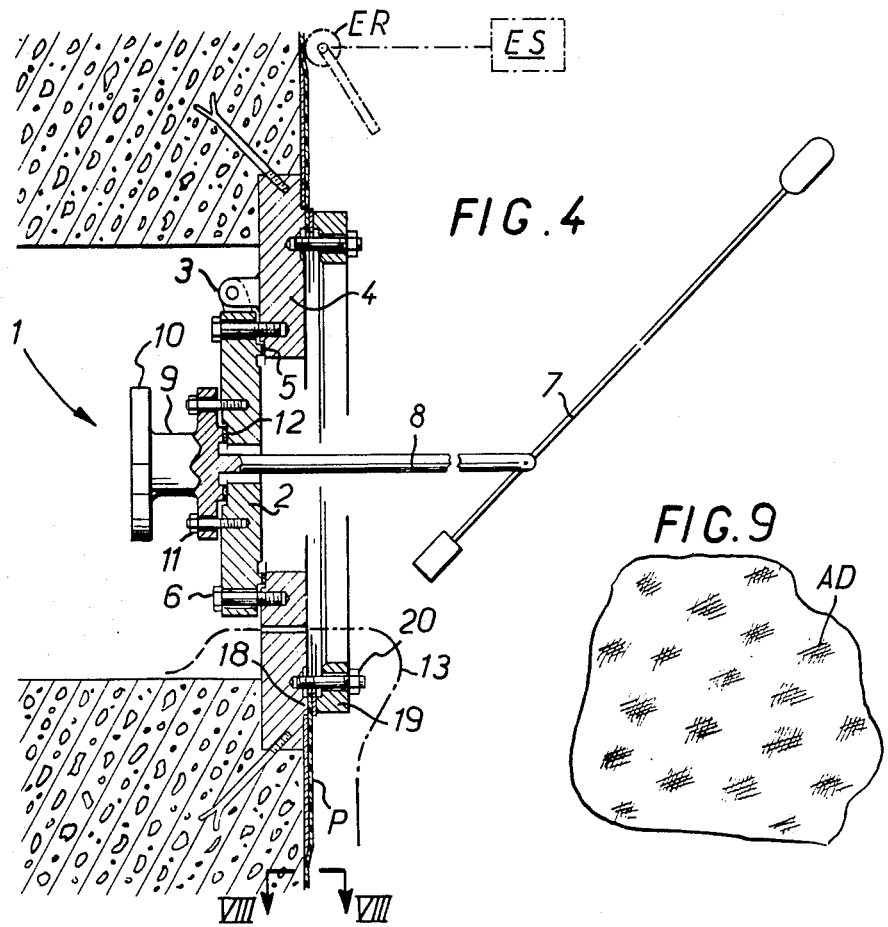
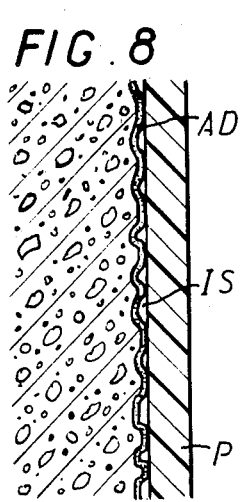
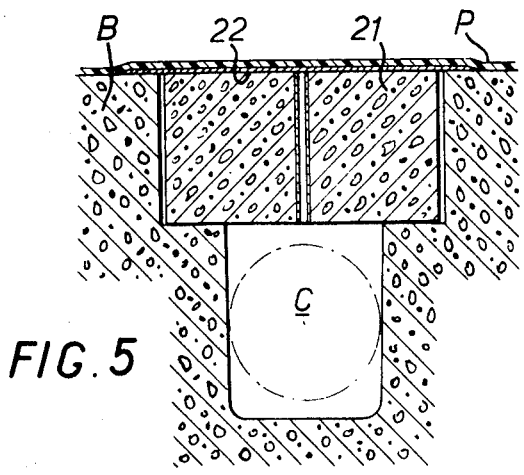

Patented Aug. 15, 1972

STORAGE OF FLUIDS

BACKGROUND OF THE INVENTION

There has been a great deal of interest given to the possibility of storing liquids and gases, in particular liquid, liquified under pressure, or gaseous petroleum products in reservoirs formed by subterranean cavities. This kind of storage economizes on the use of surface land as well as on primary building materials, since the natural formations provide means that are resistant to pressures. Further, such storage assures the maintenance of the product stored at a constant temperature and therefore at a constant vapor pressure. The stored product is taken out of contact with the air which reduces or eliminates the risk of fire. Owing to the resistance to high pressures provided by natural formations, the phenomenon of the release of vapors from a liquid product during filling, or removing, or due to changes in temperature can be reduced or eliminated.

Providing underground reservoirs in natural cavities, caverns, galleries, caves or the like presents problems such as the sealing of the cavity, carrying out the work in an enclosed space, testing the reservoir, subsequent in-service maintenance, the effect of subterranean movements or cracking of the terrain wich affects other aspects of the reservoir, such as maintaining fluidtightness about the access openings and the portions through which extend the pipes, safety precautions during operation, and the possible presence of subterranean water.

SUMMARY OF THE INVENTION

An object of the present invention is to provide a solution to the above-mentioned problems and more particularly to provide a fluidtight element which can be put into place along the entire interior surface of a completely enclosed reservoir in an economically acceptable manner and whose fluidtightness can be checked when desired either before the reservoir is made operational or during the use thereof.

A more specific aspect of the present invention, consists of a subterranean reservoir or of the type which is completely enclosed, comprising a fluidtight element consisting of a flexible and continuous skin or envelope formed of sheets of impermeable plastic material sealingly joined to one another and fixed by an adhesive against the relatively smooth surface of a lining or covering, for example, of concrete, covering the walls of the cavity, and a fluid-permeable interstitial layer disposed between the skin and the lining.

In an application of the present invention that is suitable for terrain in which there is a risk of movement or cracking, the adhesive has a residual elasticity and good creep characteristics which allows the skin to slide relative to the lining. The interstice between the skin and the lining forms a collector layer for possible leaks which can be collected and taken away by a drainage system instead of being lost in the surrounding ground. This collector layer also facilitates the removal of subterranean water which pass through the lining and exerts a pressure on the fluidtight skin.

Preferably, at least one drainage gutter, disposed under the fluidtight skin is used to collect possible leaks of the stored products and to facilitate safety checks. Such a gutter can also be used to create vacuum on the face of the skin which is in contact with the lining, to flatten the skin against the lining, and to test the fluidtightness and soundness of skin in position.

Preferably, the fluidtight skin is clamped between clamping members at the outlets and inlets of the pipes and at other openings in the skin, with the fluidtight seals at these points being formed by the skin itself.

According to another feature of the present invention, the support for the fluidtight skin comprises a massive obstruction of concrete in a predetermined zone through which extend the pipes and the control conduits and an access opening provided with a gate.

According to a further feature, means for measuring the liquid contents of the reservoir when used for such a purpose are provided; any suitable apparatus can be used which does not have a movable manner which extends through the fluidtight enclosure in order to avoid causing possible leaks.

Other objects, features and advantages of the present invention will be brought out in the description which follows, relative to the embodiments chosen by way of example, according to the accompanying drawings.

BRIEF DESCRIPTION OF THE DRAWINGS

FIG. 4 shows a detail on an enlarged scale of the access opening of the reservoir of FIG. 3;

FIG. 5 shows on an enlarged scale a section taken along the line V—V of FIG. 3;

FIG. 8 show a schematic detail in section of the skin secured to the lining according to the invention;

FIG. 9 show a schematic representation of the discrete zones of the lining on which the adhesive has been applied.

DESCRIPTION OF THE PREFERRED EMBODIMENTS

Figure 1:
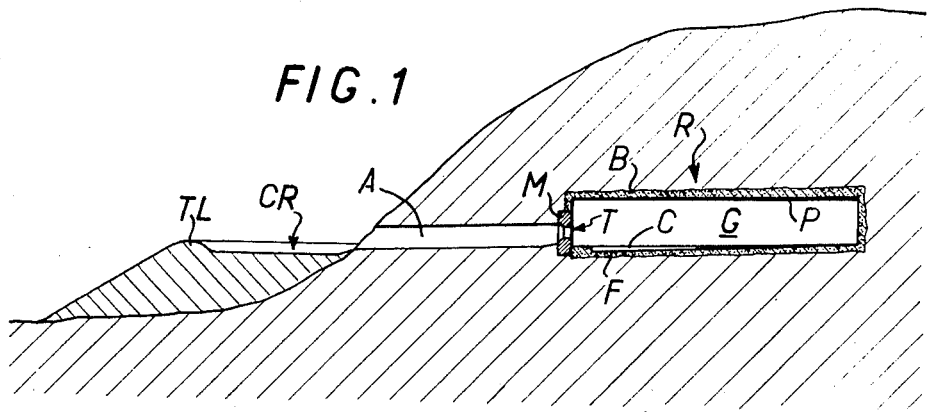
FIG. 1 schematically shows a reservoir according to the invention disposed in rising ground of a terrain.

According to the embodiment of the invention shown in FIG. 1, a reservoir R is provided in a subterranean gallery G, shown in longitudinal section and is formed as a hollow in the rising ground of the terrain. The gallery G is in communication with the earth's surface by an access gallery A which emerges in the side of the rising ground. The floor of the reservoir and that of the gallery are inclined downwardly towards the surface. An exterior embankment forms at the outlet of the access gallery A, a collecting basin CR bounded by a mound TL for receiving liquids stored in the reservoir R in case of an accident or leaking.

The reservoir R comprises a concrete lining B covering the surface of the gallery G which is in turn covered by a fluidtight skin P which is flexible and continuous.

The storage gallery G is separated from the access gallery A by a massive obstruction M formed of concrete in which is disposed a man-hole passage T which assures communication between the galleries A and G. The massive obstruction will be described in further detail hereinafter. A gutter C is provided in the lining of concrete B and runs along the entire length at the bottom of the reservoir beneath the fluidtight skin P. The bottom face F of the gutter C is inclined downwardly towards the access gallery G.

Figure 2:
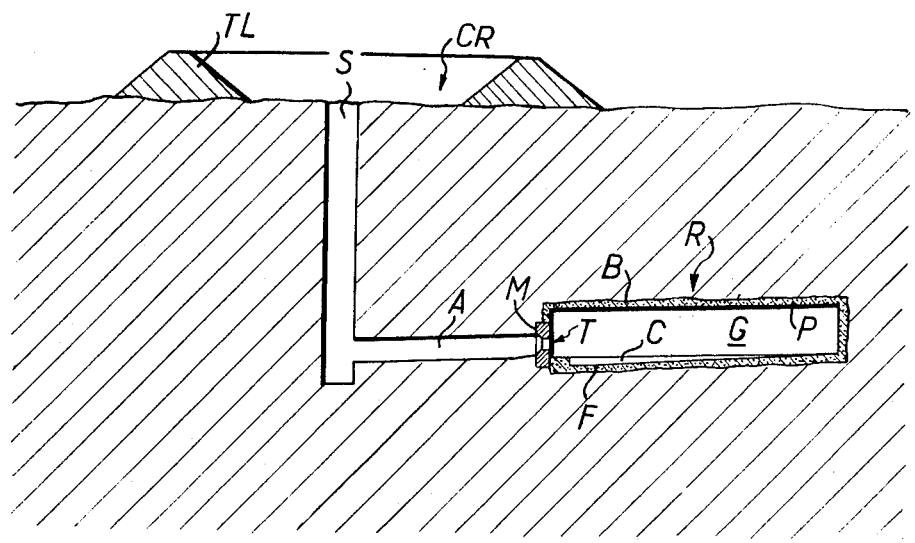
FIG. 2 shows another reservoir according to the invention disposed deep beneath the surface of a flat terrain.

In FIG. 2 elements corresponding to those of FIG. 1 are represented by the same indicia. The reservoir R is disposed deep below a flat terrain and the access gallery A communicates with the surface by a shaft S.

In the two embodiments shown in FIGS. 1 and 2, the earth bed surrounding the reservoir has a thickness and an adequate resistance to take the maximum pressure exerted by liquids and gas when the reservoir is in use while maintaining a high degree of safety. The same access gallery could be used for several reservoirs by branching off.

Preferably, the storage gallery G has a regular shape approaching that of a cylinder or a regular prism in order to facilite the laying of the concrete lining B. The concrete is conveniently placed on the rough walls of the gallery G by spraying the mortar, or by flowing the concrete between the walls and metal shuttering which provides after the removal thereof a relatively smooth surface adapted to receive the fluidtight skin P. Should it be considered necessary, mortar could be injected later through the lining to fill holes behind in the lining to assure the connection thereof with the adjacent rock walls of the cavity.

The fluidtight skin P should be of a material having the following characteristics;

sufficient imperviousness to the products to be stored, in the liquid or the vapor state, under the maximum pressure exerted during use;

mechanical resistance so that it can support a maximum load without bulging, or being torn by the irregularities of the concrete walls that could be present, in particular by paving stones provided above the gutter, or the mountings of the gate or the pipes or at any other point;

dimensional stability so that it does not stretch or shrink in the case of a variation in ambiant conditions such as the underground dampness during or after construction;

resistance to micro-organisms and other destructive agents in the underground environment;

adherence to adhesives and sealing compounds.

Preferably, this material is in sheet-form having relatively large dimensions in order to reduce the time for positioning.

The lining face and therefore the skin is preferably defined by developable surfaces, for example, cylindrical or prismoidal surfaces or flat surfaces ; non-developable surfaces which may exist are preferably covered by preformed or stamped sheets and/or coated with a sealing compound used for joining the sheets to one another.

In order to assure the fluidtightness of connections with the metal parts, in particular at the gate and the outlets and inlets of the pipes, such parts are provided with bolted clamping members accessible from the interior of the reservoir and a plastic seal formed by the fluidtight skin itself clamped between the clamping members.

The skin is stuck to the surface of the lining by an adhesive and in a sufficiently flexible manner to enable a slight sliding movement of the skin relative to the walls without tearing the skin and to permit the flow of possible leaks towards drainage gutters.

For the sake of example, sheets of commercial quality polyester having a thickness of 0.35 mm. may be used and placed on the concrete lining which is previously coated with an adhesive having a residual elasticity and good creep characteristics comprising neoprene and a solvent. The sheets are then joined to one another by lap-joints by means of a polymerizable, sealing composition of a known type such as the "Thiokol" type obtained by mixing two separate ingredients having a limited time for setting or hardening. The residual elasticity and good creep characteristics of the adhesive allows the displacement of the fluidtight skin relative to the concrete lining.

In contrast to fluidtight layers formed directly on the surface of the lining, the sheets of plastic material according to the invention are industrial products which can be manufactured and tested under the rigorous controls possible only in a factory before being used. Further, such sheets offer the degree of resistance required of a material which will have to withstand the force exerted by construction and service equipment in the subterranean galleries.

The adhesive is applied to the lining in such a manner as to preserve a fluid permeable interstitial TL (See FIG. 8) in particular a gas-permeable layer between the fluidtight skin and the lining. In the case of a concrete lining, such a permeability is conveniently achieved by applying the adhesive with a spray gun as a continuous film having a thickness less than the protrusions of the surface irregularities thus to provide points of adhesion around which the fluid is able to circulate. Should it be desired the adhesive AD may be applied in discrete blotches or zones rather than as a continuous film (See FIG. 9).

Knowing the delivery rate of a spray gun, and the angle defined by a conical jet of the sprayed material, it is possible to determine a suitable distance of the gun from the lining face and to apply the adhesive in quick, successive, timed bursts while moving the gun between bursts to produce discrete or non-overlapping blotches, so as to keep the thickness of the coat of adhesive within the required limits.

The sealing compound used to join the sheets to one another is formed as a continuous band or strip and is applied with a brush or any other means known to the skilled workman in the art in order to form a seal which is impermeable to the product to be stored. Alternatively, the sheets may be joined to one another by welding or seaming along the lap joints.

Figure 3:
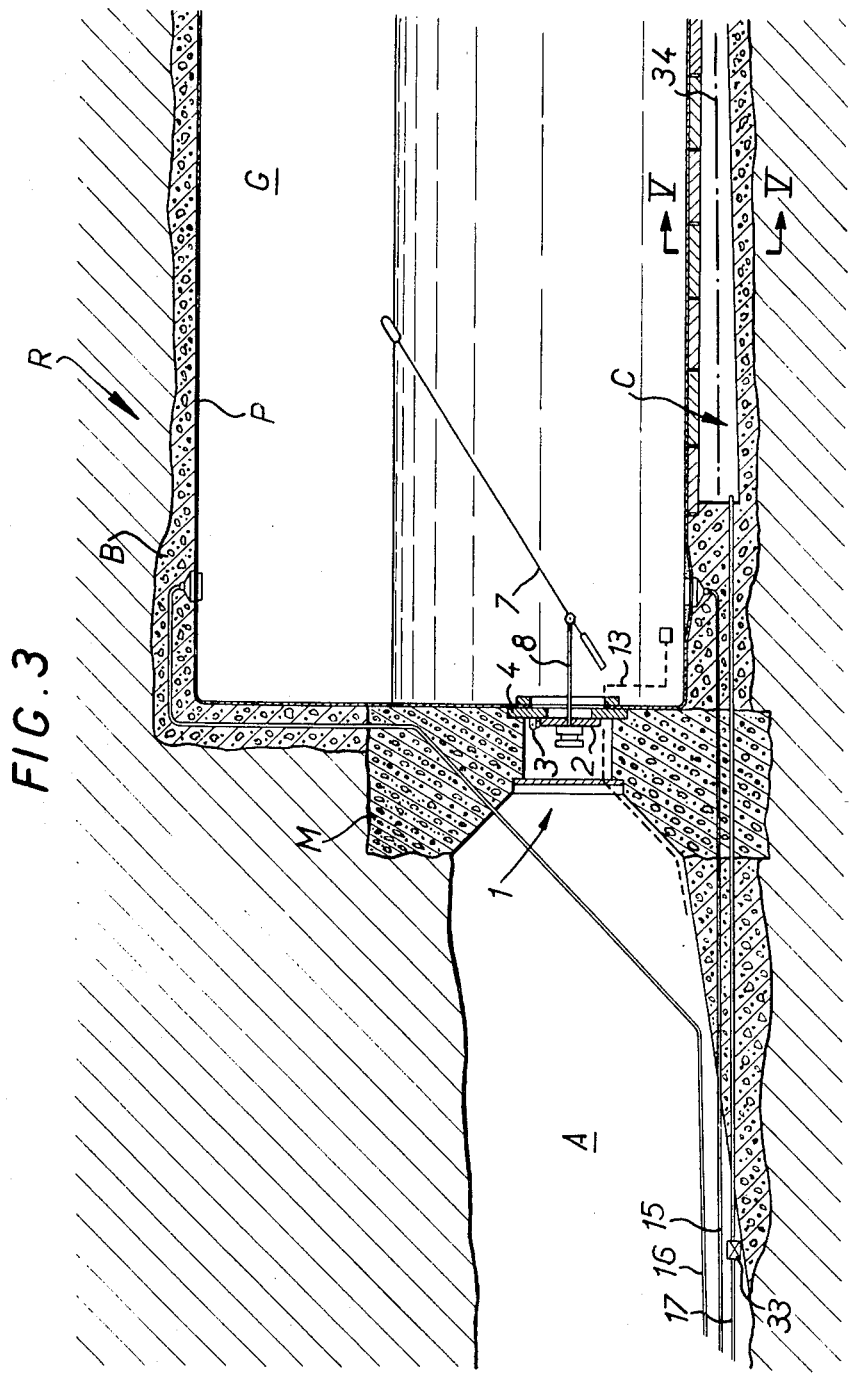
FIG. 3 shows on an enlarged scale a part of a reservoir in longitudinal section.

FIG. 3 shows, in longitudinal section, the end of the storage gallery G at the end adjacent to the access gallery A. A passage 1 extends through the massive obstruction M which separates the two galleries and is of a progressively diminishing cross-section starting from the access gallery towards the storage gallery followed by a cross-section of constant diameter. The cross-section of constant diameter communicates with the reservoir R by means of a gate 2 pivotally mounted about a horizontal pivot 3 in engagement with he exterior face of frame member anchored in the massive obstruction M. A seal 5 is disposed between the gate 2 and the frame member 4 and the gate 2 is maintained in position by securing bolts 6 (See FIG. 4).

A liquid level measuring device permits the measurement of the quantity of liquid stored in the reservoir, when the latter is used for this purpose, and comprises a support arm 8 which extends through the gate 2 from a supporting head including a liquid level indicator 10 readable from the access gallery, the supporting head being secured to the gate by screws 11 and sealed against the gate 2 by a seal 12. At the end of the fixed arm 8 remote from the supporting head, a float 7 is pivotally mounted and responsive to the liquid level in the reservoir R. The pivotal movement of the float arm is transmitted to the indicator 10 preferable by a suitable magnetic actuating means of known type or any other known device which does not require a movable element to pass through the fluidtight enclosure in order to avoid creating possible leaks. Accordingly, the reservoir may be suitably provided with an ultra-sonic liquid level detector such as shown at 13 which merely requires the passage of a fixed coaxial electrical cable through the fluidtight enclosure.

The gate frame 4 has on its inner face a peripheral projecting zone 18 which assists in forming a sealing joint by squeezing the skin P around the frame opening between the zone 18 and a clamping member 19 fixed to the frame by means of screws 20.

The gutter C, shown in transverse section in FIG. 5, is covered with paving stones 21 which are perforated or laid with dry joints so that the upper face of the paving stones are flush with the surface of the concrete lining B in order to facilitate the positioning of the fluidtight skin P.

In order to reduce the effect of any difference in level which might exist between the paving stones and the lining, a sheet of plastic material 22 is interposed along the entire length of the paving stones between the latter and the skin P.

Three pipes 15, 16 and 17 extend through the massive obstruction M and assure the communication between the reservoir and the exterior. The filling pipe 15 terminates in the bottom of the reservoir for feeding in the product to be stored. The pipe 16 is used to feed in or withdraw gas and terminates in the top of the reservoir. The pipe 17 is in communication with the gutter C and assures the drainage of subterranean water which may penetrate the interstitial space IS (FIG. 8) between skin P and the concrete lining B and which unless removed would tend to separate the skin from the lining.

Figure 6:
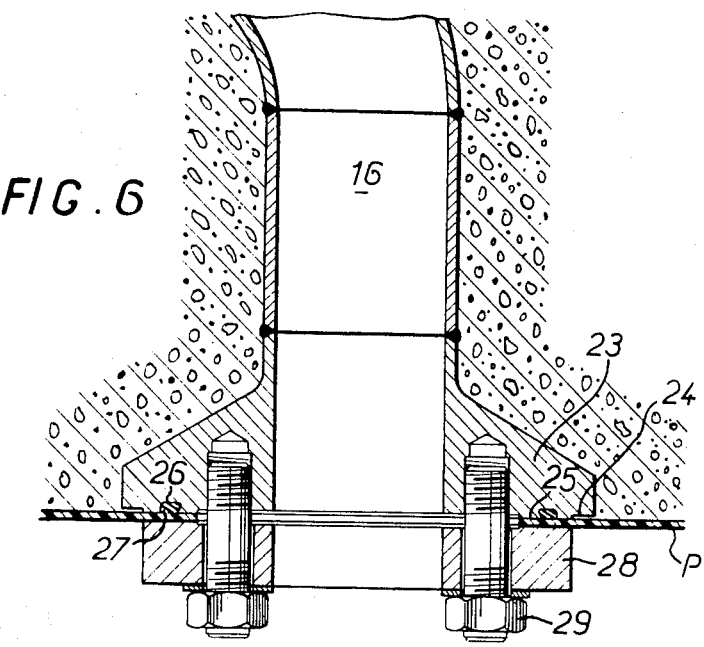
FIGS. 6 and 7 show on an enlarged scale details of the mounting of pipes opening into the reservoir.

FIG. 6 shows the flanged end 23 of the pipe 16 which is secured in the top of the reservoir R and includes a flat surface substantially perpendicular to the axis of the pipe 16 and flush with the surface of the concrete lining B. An annular portion 24 projects from the flat surface 24 and includes an annular groove 26 concentrically arranged therein. A ring-shaped packing 27 is received in the groove 26. The fluidtight skin P covers the ring-shaped packing 27 and is clamped between the annular projecting portion 24 by the opposed clamping plate 28 which is fixed to the flanged end 23 of the pipe 16 by studs 29 threaded at both ends.

Figure 7:
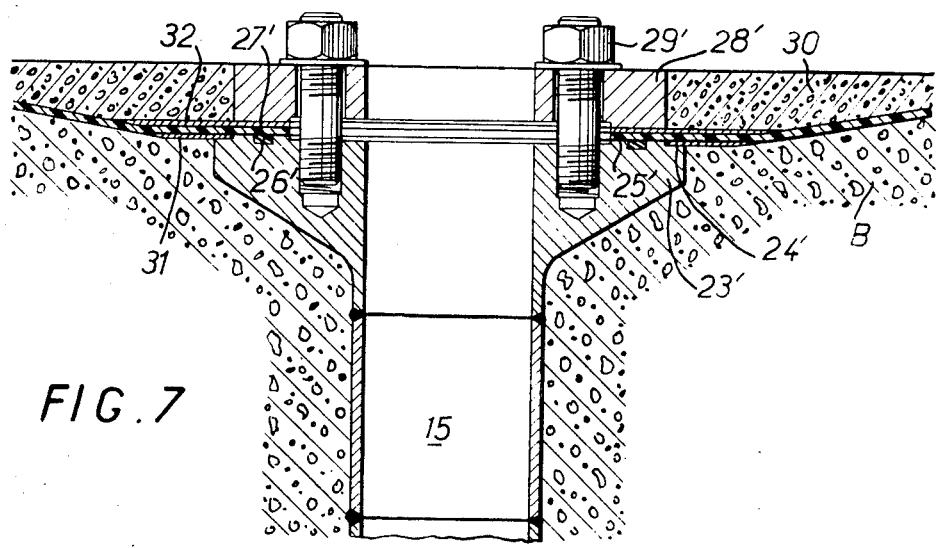

A similar construction for securing the end of the pipe 15 in the bottom of the reservoir is shown in FIG. 7. Elements of FIG. 7 which correspond to those of FIG. 6 are designated by the same numbers primed. The zone of the concrete lining B into which the pipe 15 is run is formed as a dished-shaped depression 30. The flat outer face 24' of the flanged end 23' is positioned flush with the bottom of the depression 30. In order to overcome any possible difference in level between the flat outer face of the flanged pipe and the bottom of the depression in the surface of the concrete lining which surrounds it, a ring 31 of plastic material is placed over the peripheral portion of the flanged end and the adjacent concrete surface. The skin P is in turn superposed thereon, and another ring 32 of plastic material is interposed between the fluidtight skin P and the opposed clamping plate 28'. If desired, the depression 30 could be filled in with any suitable product after the opposed clamping plate is brought into position.

In a general manner, rings for overcoming the differences in levels, such as the ring 31, and the ring-shaped packings, similar to the element 27, can be used about the peripheral portions of each opening which extends through the fluidtight enclosure.

The fluidtightness of the enclosure can be tested at the completion of contruction in several manners, in particular:

A partial vacuum may be effected in the drainage gutter and the pipe in communication therewith which thus effects a pressure in the fluidtight enclosure greater than the pressure of the surrounding interstitial layer by leaving the enclosure at atmospheric pressure, open and in communication with the exterior. The positioning of the fluidtight skin can thus be seen as well as the slight sliding movement produced thereby. The location of possible leaks can generally be effected by the sound caused thereby.

By taking advantage of the dielectrical properties of the materials comprising the enclosure, the continuity can be tested by an electrostatic sweep ES or roller ER (See FIG. 4), each defect which could potentially cause a leak effecting the actuation of a visual or audio alarm, or causing an electric arc discharge.

The fluidtightness of the enclosure could also be tested by a trial run by pneumatic or hydraulic means, for example, by filling the reservoir with water if such resources are available.

According to another method for checking the fluidtightness, the skin can be formed of a transparent material and the reservoir filled with a fluid capable of reacting with the residually elastic adhesive on which will be left evidence in the case of leaks, with some fluid penetrating the interstitial layer.

The fluidtightness can always be checked once the reservoir is in operation as follows:

by checking the drainage control pipe in order to determine whether there is a discharge to the exterior or:

by placing at the end of the drainage control pipe a detector 33 for hydrocarbons or for any other stored product. The sensitivity of such a system could be improved by providing a continuous current of air or nitrogen in the gutter by means of a pipe 34 carrying compressed air or nitrogen for example which preferably has an outlet at the end of the gutter remote from the massive obstruction M, or by means of a vacuum pump drawing air off at the end of the pipe for carrying towards the detector vapors released by the leak of hydrocarbons or other stored products (See FIG. 3);

or by checking the atmosphere in the access gallery or shaft in the vicinity of the reservoir with blower means if desired.

The invention is of course not intended to be in any way limited by the embodiments which have been shown and described hereinabove merely by way of example, but includes all possible alternatives, modifications, equivalents, within the scope of the appended claims.

What is claimed is:

1. In an underground cavity, an enclosed reservoir for storing fluids, said reservoir comprising a rigid lining covering the walls of the cavity, said rigid lining having a surface characterized by irregularities, a flexible fluidtight skin disposed over the interior of the rigid lining, and adhesive means for securing said skin to the walls of the lining and effecting a laterally operative fluid-permeable interstitial layer therebetween.

2. A reservoir as claimed in claim 1, wherein said adhesive means has a residual elasticity and a creep characteristic for enabling said skin to slide relative to said rigid lining.

3. A reservoir as claimed in claim 1, further comprising a massive obstruction disposed at one end of said reservoir and having a passage of reduced cross-section, and a gate operative between a first position in which said passage is closed and a second position in which said passage is open.

4. A reservoir as claimed in claim 1, further comprising at least one pipe extending through the fluidtight enclosure formed by said skin and into communication with the interior of said reservoir, said pipe being provided with a flanged end and an opposed clamping plate, the portion of said skin through which said pipe extends forming a gasket which is clamped between said flanged end and said opposed clamping plate.

5. A reservoir as claimed in claim 1, further comprising a liquid level control means including a movable member responsive to the liquid level in the reservoir and a fixed member which extends through the fluidtight enclosure of the reservoir including means for operating indicator means disposed outside the reservoir.

6. A reservoir as claimed in claim 1, wherein the lining is formed of concrete and includes a gutter spaced beneath the skin for collecting liquid leaks from the interstitial layer.

7. A reservoir as claimed in claim 6, wherein the gutter is in communication with a pipe for carrying away leaks, and wherein a leak detector is disposed in the combination including the gutter and the pipe in communication therewith.

8. A reservoir as claimed in claim 7, wherein blower means is provided in the gutter for assisting the removal of leaks and detection of leaks by the detector.

9. A reservoir for storing fluids comprising: a rigid closure having an internal surface characterized by irregularities, a flexible fluidtight envelope disposed within the rigid enclosure, said envelope being formed of sheets of plastic material sealingly joined to one another, and adhesive means for securing the skin to the internal surface of the rigid enclosure and providing a fluid-permeable interstitial layer therebetween.

10. A reservoir as claimed in claim 1, wherein said rigid lining is formed of a concrete-like material having surface irregularities, the thickness of said adhesive means being less than the protruding distances of said irregularities.

11. A method for constructing a reservoir in a subterranean cavity, comprising the steps of lining the walls of said cavity with a hardenable material having surface irregularities upon hardening, allowing said material to harden, and adhesively securing flexible impermeable sheet material to the inner surface of the lining, to an extent which is less than the full depth of the surface irregularities of the lining, whereby a laterally operative fluid-permeable interstitial layer is established between said sheet and the lining.

12. A method as claimed in claim 11, wherein said adhesive is applied to the lining walls in a film having a thickness less than the depth of said surface irregularities of the lining, thereby forming an interstitial fluid-permeable layer between said envelope and the lining.

13. A method as claimed in claim 12, wherein the hardenable mass is sprayed onto the walls of the cavity, and the adhesive is sprayed onto the rigid lining.

14. A method as claimed in claim 12, wherein the adhesive is applied to discrete non-overlapping zones on the rigid lining.

15. A method as claimed in claim 12, further comprising the step of testing the fluidtightness of said envelope by creating a partial vacuum between said envelope and said lining, connecting the interior of said reservoir with a source of atmospheric pressure, and checking said envelope to find defects which could cause leaks when said reservoir is in use.

16. A method as claimed in claim 12, wherein the interior surface of the envelope is formed of a dielectric material, and further comprising the step of checking said envelope by passing an electrostatic means along the interior surface of said envelope.

17. A method as claimed in claim 11, further comprising the steps of at least partially filling the envelope with the fluid, said adhesive being visibly reactive to the fluid, and checking the adhesive for visible traces caused by leaks in said envelope.

18. A method as claimed in claim 12, wherein said interstitial layer forms a collector layer for leaks from the stored fluid so that the fluidtightness of said envelope can be tested by draining the collector layer before as well as while the reservoir is in service.

19. A method as claimed in claim 18, wherein said collector layer is adapted to collect ground water, and further comprising the step of removing subterranean water from the surroundings of the reservoir by draining water from said collector layer which has permeated said lining and been collected in said collector layer.

20. The method of claim 11, wherein said sheet material is applied as plural sheets in sealed overlap with each other.

* * * * *